United States Patent
Hamilton et al.

(10) Patent No.: US 8,316,116 B2
(45) Date of Patent: *Nov. 20, 2012

(54) SIMPLE HOME NETWORKING

(75) Inventors: Stuart Hamilton, Livemore, CA (US);
Pamela S. Lee, San Jose, CA (US);
Archana Rao, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/367,702

(22) Filed: Feb. 7, 2012

(65) Prior Publication Data

US 2012/0136975 A1 May 31, 2012

Related U.S. Application Data

(63) Continuation of application No. 11/188,611, filed on Jul. 25, 2005, now Pat. No. 8,117,290.

(51) Int. Cl.
*G06F 15/177* (2006.01)
(52) U.S. Cl. ........................................ 709/221; 709/223
(58) Field of Classification Search .......... 709/220–222, 709/223
See application file for complete search history.

(56) References Cited

U.S. PATENT DOCUMENTS

| | | | | |
|---|---|---|---|---|
| 7,536,453 B2* | 5/2009 | Fingerhut et al. | ............ | 709/223 |
| 8,117,290 B2* | 2/2012 | Hamilton et al. | ............ | 709/221 |
| 2002/0138443 A1* | 9/2002 | Schran et al. | ................... | 705/64 |
| 2004/0133689 A1* | 7/2004 | Vasisht | ........................ | 709/228 |
| 2006/0062255 A1* | 3/2006 | Holloway et al. | ............ | 370/477 |

OTHER PUBLICATIONS

Ben Y. Zhao et al.; Tapestry: An Infrastructure for Fault-Tolerant Wide-Area Location and Routing; Report No. UCB/CSD-01-1141; Computer Science Division (EECS); University of California, Berkeley; Apr. 2001.*

* cited by examiner

*Primary Examiner* — Kenneth R Coulter
(74) *Attorney, Agent, or Firm* — Haynes and Boone, LLP

(57) ABSTRACT

A network management system is provided for managing a computer network. The management system is configured to represent the computer network as having one of a plurality of defined network states. Once the state of the network has been identified, the management system can assist the user in making modifications to the computer network and in making recommendations to the user for possible modifications to the computer network. These modifications can include, for example, configuring network devices, removing network devices, replacing network devices, and adding new network devices.

20 Claims, 7 Drawing Sheets

SIMPLE HOME NETWORKING

CROSS REFERENCE TO RELATED APPLICATIONS

This application is a continuation of and claims the benefit of priority from U.S. patent application Ser. No. 11/188,611, filed Jul. 25, 2005, now U.S. Pat. No. 8,117,290, issued Feb. 14, 2012.

BACKGROUND

With the popularity of personal computers and broadband Internet access, home users have increasingly begun to implement computer networks in their homes and small offices. Unfortunately, home users often lack the technical expertise to implement, sustain, and maintain even simple computer networks. A home user may lack knowledge of the basic hardware components needed to provide the services desired by the user. In many cases, a home user may even lack an understanding of the types of services that are available.

Networking hardware manufacturers have attempted to address this problem by providing more user-friendly software applications to assist users in installing and configuring networking equipment. For example, a router may be sold bundled with installation utility software (e.g., a Setup Wizard) on a CD-ROM. When a user installs and executes this installation utility software, a simple graphical user interface (GUI) may be provided with pictures and/or video instructing the user on how to physically install the new piece of equipment. The software may also assist users in setting various configuration parameters for the equipment. Unfortunately, the assistance provided by this installation software typically relates to "standard" installations, and may not provide any assistance in installing or configuring a more complicated network. In addition, the installation utility may not take into account the current setup of the network in guiding the user to install the new equipment. As the amount of networking equipment and network services increase, the complexity involved with modifying the network increases as well, making the generic installation software even less helpful.

In general, a novice home user will typically require assistance with the following issues in setting up a home network. First, the user will need guidance as to the proper equipment to purchase. Second, the user will need guidance in setting up the equipment. Third, the user will need assistance with basic troubleshooting when the network does not perform as expected. Finally, the user will need assistance in making changes to the network (such as to expand or modify the network), because of the first three reasons above.

As the proliferation of home networking accelerates, users will continue to upgrade, improve, and expand their networks over periods of months and years. This generally requires that the end user maintain familiarity with the particular method used for configuring and reconfiguring each individual network component over extended periods of time. For casual home computer users, this can be overly burdensome task.

Accordingly, it would be desirable to provide a method of assisting users to install, configure, modify, update, and manage their computer networks without the presumption of any technical knowledge on the part of the user.

DETAILED DESCRIPTION

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

Some portions of the detailed description which follows are presented in terms of procedures, steps, logic blocks, processing, and other symbolic representations of operations on data bits that can be performed on computer memory. Each step may be performed by hardware, software, firmware, or combinations thereof.

In order to improve the ease with which a user can manage a computer network, it is helpful to conceptualize the network as a single entity possessing a single overall configuration, as opposed to being a collection of components each having its own configuration, as is currently the case. One method by which this may be accomplished is to represent the current operating mode of the network as being in a single unique state. This state may be described by a combination of discrete functional elements which are selected from a larger, but finite, set of elements.

The conceptualization of the network as occupying a defined state at a given moment in time provides a temporal context to the state of the network. In other words, a current overall network state suggests that a network state existed prior to the current state, and that there exists a defined set of subsequent states to which the currently occupied state can transition. That transition may occur as a result of: (a) the physical addition, replacement, or removal of a network component; (b) the modification of variables, parameters, etc. of these network components; or (c) a combination of the preceding conditions.

Another potential benefit of describing network components in terms of discrete functional elements is that a component could be physically constructed as a hybrid or compound device (e.g., a cable modem, router, wireless access point combination device), but still be described in terms of discrete functional elements. Thus, the functionality of the network may be extracted from the physical realization of the network.

Figure 1A:
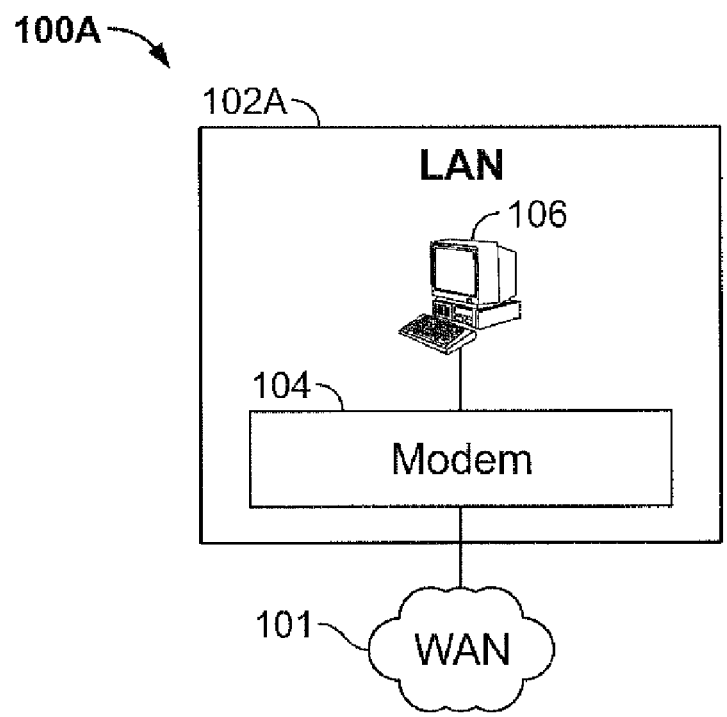
FIGS. 1A-1D illustrate various configurations of data communications networks that may represent exemplary home network configurations.

FIGS. 1A-1D illustrate various configurations of data communications networks that may represent exemplary home network configurations. FIG. 1A is a block diagram showing a simple home network comprising a modem 104, which bridges a wide area network (WAN), such as the Internet, with a local area network (LAN) 102A. A single standalone device, e.g., personal computer (PC) 106, is provided in the LAN 102A via direct connection to the modem 104. If the modem 104 is represented by the letter "M" and the standalone device is represented by the letter "S", then the complete network configuration for LAN 102A can be represented as occupying state "M+S". Since the PC 106 can be considered a peripheral device, the core state for the network can be represented as "M".

Figure 1B:
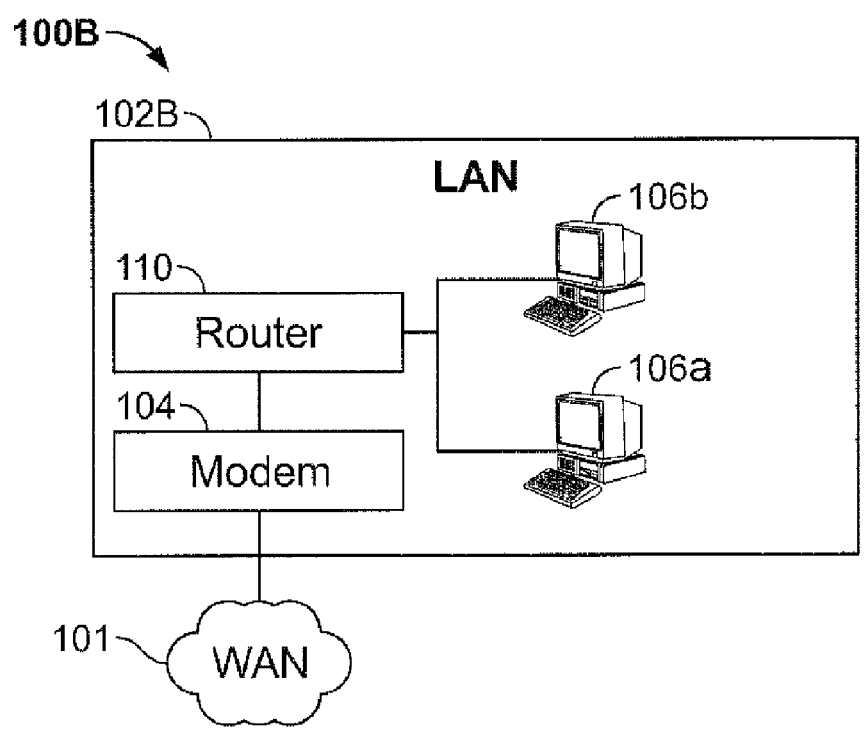

FIG. 1B is a block diagram showing a data communications network 100B. When two or more standalone devices, such as PCs 106a-106b, are to be connected to the LAN 102B, an intermediate device, such as a router 110, is added between the modem 104 and the standalone devices. If the router 110 is represented by the letter "R", then the complete network configuration shown in FIG. 1B can be represented as occupying state "M+R+S", and the core state for the network can be represented as "M+R".

Figure 1C:
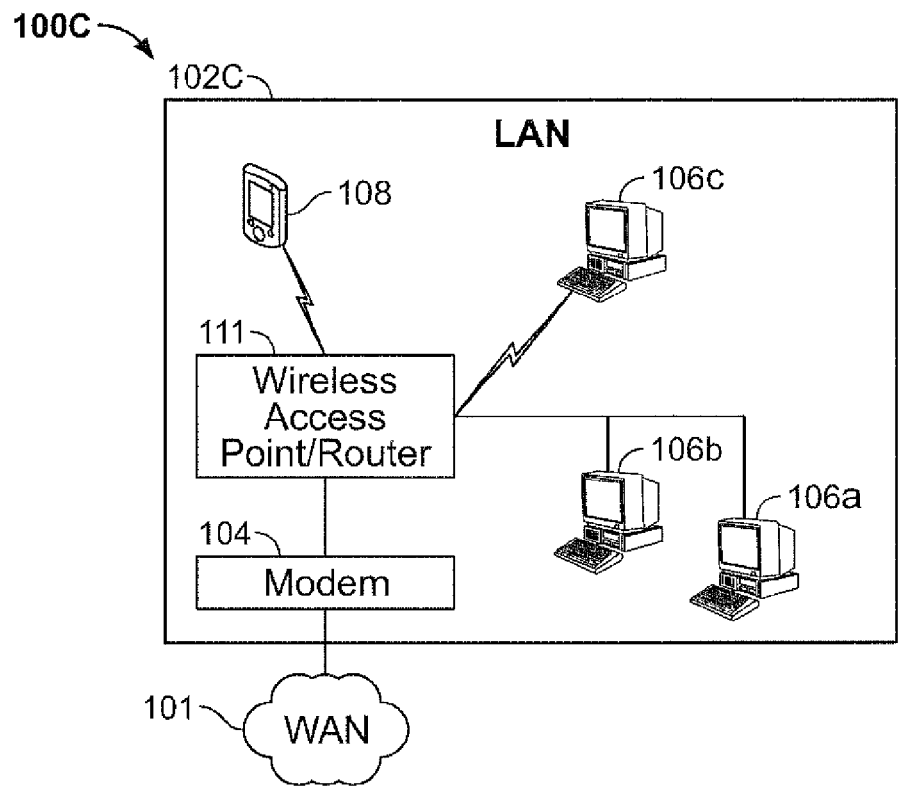

FIG. 1C is a block diagram showing a data communications network 100C in which a combination wireless access point (WAP) and router 111 is connected to the modem 104. The WAP/router 111 provides wireless network connectivity to the LAN 102C for various devices, such as a PC 106c having a wireless adapter and a WiFi-enabled personal digital assistant (PDA) 108. The WAP/router 111 may provide a wireless network compliant with the standards governed by, e.g., IEEE 802.11 ("WiFi"), IEEE 802.15.1 ("Bluetooth"), ultra wideband (UWB) radio, and the like. If the WAP/router 111 is represented by the letters "RA", then the core state for network shown in FIG. 1C can be represented as occupying state "M+RA".

Figure 1D:
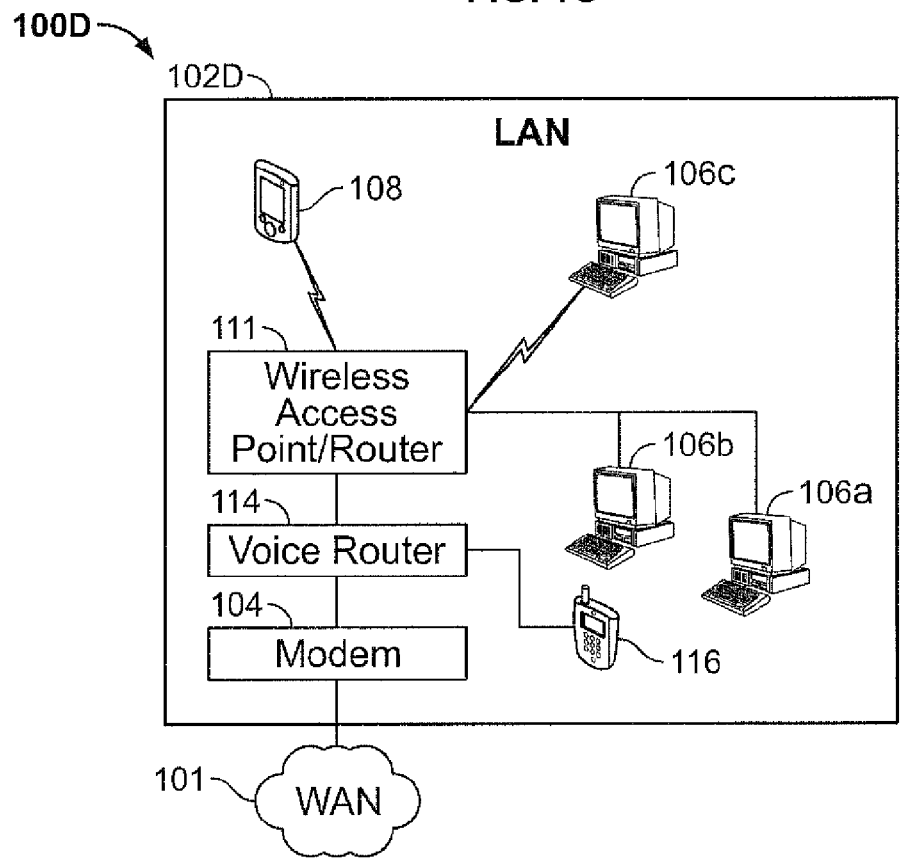

FIG. 1D is a block diagram showing a data communications network 100D in which a voice router 114 is connected between the WAP/router 111 and the modem 104. The voice router 114 provides phone services to conventional analog telephones, such as telephone 116, using Voice over IP ("VoIP") over the WAN 101. By providing the VoIP services, the VoIP router serves as both an IP endpoint for the VoIP function and as a NAT for the routing function to the PCs 106a-106b. As a result, it may be useful to represent the voice router 114 differently than the WAP/router 111. If the voice router 114 is represented by the letter "V", then the core state for network shown in FIG. 1D can be represented as occupying state "M+V+RA". In this example, the WAP/router 111 provides wireless and routing functions, and the voice router 114 provides voice and routing functions. Although the routing functions provided by the WAP/router 111 and voice router 114 may be redundant, the routing functions are typically embedded in the devices currently on the market. Therefore, the routing function of one of the routers can be disabled during the setup process without requiring any action on the user's part.

In many networks, the fundamental network elements described above with respect to FIGS. 1A-1D can be physically combined into a single device. For example, a residential gateway may integrate the broadband modem, router, Ethernet switch, and 802.11 access point into a single physical enclosure. One such combination device is the Wireless-G Cable Gateway (Model WCG200) by Linksys, a division of Cisco Systems, Inc., of San Jose, Calif. The core state provided by such a combination device may be represented as "M+R+A". However, in the representation of the core state, it may be useful to indicate that all functions are provided by a single device. One way this could be represented is by removing the plus ("+") sign to obtain "MRA".

In accordance with embodiments of the present invention, the representation of the core state of the computer network can be used to guide a user in transitioning the network to a new core state. This state transition may comprise a transition back to a previous core state or transition to a new core state. In either case, it may be desirable to provide a weighing system to assign a value to each core state relative to the other possible core states.

In one example, each core state is weighed in terms of its probability. It is expected that there are some functional combinations of network functions that will be redundant, and therefore representative of an unlikely (or improbable) state. These instances may be treated as non-preferable and therefore can be viewed as "non-supported" or "non-approved" from a technical support perspective.

In another example, each core state can be weighed by preference. Given a current core state, there exists a set of core state transitions that are possible given the breadth of product and connectivity possibilities. However, not every core state transition would be desirable or preferred. Once an adequate and accurate characterization of the current network functionality and topology is obtained, a user may be provided advice as to the recommended next core state.

In accordance with embodiments the present invention, a software application for execution on an endpoint device in a computer network, such as a personal computer in a LAN, is provided for assisting a user in managing a computer network. This PC can then be used as a network management system for managing the LAN. The management system is configured to represent the computer network as having one of a plurality of defined network states. Once the state of the network has been identified, the management system can assist the user in making modifications to the computer network and in making recommendations to the user for possible modifications to the computer network. These modifications can include, for example, configuring network devices, removing network devices, replacing network devices, and adding new network devices.

Figure 2:
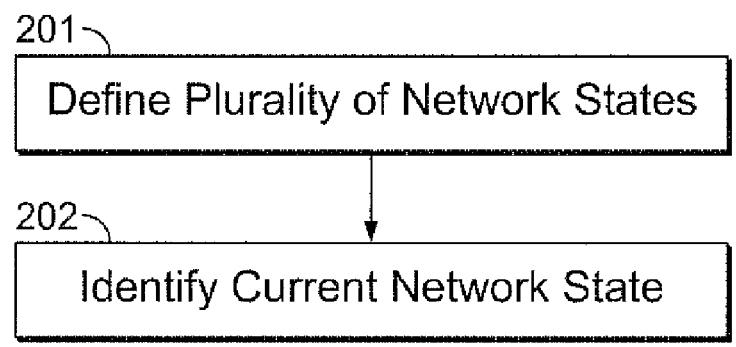
FIG. 2 shows an exemplary method of managing a computer network, in accordance with embodiments of the present invention.

FIG. 2 shows an exemplary method of managing a computer network. In step 201, a plurality of network states are defined. Each of these network states represents a unique configuration of network device functions. In step 202, a current network state is identified from the plurality of network states. This network state represents the existing configuration of network devices in the computer network.

In a first embodiment, the network state representing the configuration of network devices in the computer network is limited to representing the core network functions. The network core forms the basic building blocks of a home network, such as the modem, router, wireless access point, voice router, and switches. The core functions provided by the devices in the network core may be defined as the modem, router, wireless access point, and voice router functions. In this embodiment, a switch is not categorized as one of the core functions because the switch function is generally embedded in the router device. Switches that are added to the network to provide additional network ports can be treated as a peripheral because they do not impact the network setup and are largely non-configurable. These core functions may be represented using codes, such as the single alphabetic characters (M, R, A, and V) described above with reference to FIGS. 1A-1D. It is to be understood that this is merely an example, and in other embodiments, greater or fewer core functions may be used in to represent the state of the network. For example, wireless access point devices may be represented by two unique core functions: "A" to represent WAP devices that communicate using the IEEE 802.11b and 802.11g protocols, and "A'" to represent WAP devices that communicate using the IEEE 802.11a protocol. In addition, the core state can be represented using additional detail regarding the network devices. For example, the core state may include the configuration settings of the core network devices.

A product code is a code that defines a specific combination of core functions that are integrated into a single device or product. For example, the Linksys Wireless-G Cable Gateway described above may be represented with the product code "MRA". Table 1 illustrates some examples of product codes:

TABLE 1

Product Code Examples

| Type of Product | Product Code |
| --- | --- |
| Wireless A + G router | RAA' |
| Wired voice router | V |
| Wireless A + G access point | AA' |
| Wireless G router | RA |

A core state transition comprises the change from one core state to another. For example, if the network core comprises a modem coupled to a wireless router, the core state is represented as "M+R". Replacing the wired router with a wireless router incorporating a wireless access point represents a core state transition from "M+R" to "M+RA". In another example, in a network comprising a PC connected directly to modem, the core state is represented as "M". Adding a wireless G router to the network represents a core state transition from "M" to "M+RA".

The various devices that connect to the network core, such as a PCI wireless adapter installed in a personal computer, may be represented as peripherals to the core network. One type of peripheral is a PC adapter, which is used to connect a PC to the network. These PC adapters can be defined by their method of connectivity to the PC and by their method of connectivity to the network. For example, a PCI Ethernet adapter connects to the PC through a PCI slot interface in the PC's motherboard, and connects to the network via an Ethernet cable using an RJ-45 connector. A wireless USB adapter connects to a desktop or laptop PC via a USB interface, and connects to the network wirelessly using, e.g., WiFi. A PC card adapter connects to a laptop via a PC card slot. The PC card adapter may be a wired Ethernet network adapter having an RJ-45 connector for connection to a router via an Ethernet cable, or may be a WiFi adapter for wireless connection to a WAP.

Other types of peripherals are available. These peripherals may be defined by their method of connectivity to the network (e.g., by WiFi or Ethernet cable) and by the functionality they provide. Examples of peripherals include phone adapters, Internet cameras, media systems, gaming adapters, print servers, network attached storage. The categories and functionality of these peripherals will grow as new products and capabilities evolve. Embodiments of the present invention may be configured to receive periodic updates in order to stay current and manage new products as they emerge.

In accordance with embodiments of the present invention, the network management system may provide both reactive and proactive functions in assisting users in managing a computer network. The reactive aspect provides users with assistance in installing and managing network equipment already acquired by the user. The reactive function may be initiated based on an automatic detection of a new device on the network, or may be initiated based on input from the user informing the system of the new device. The proactive aspect guides users in making decisions regarding new network equipment to acquire based on the functionality that the user wishes to add to their network. In providing both the reactive and proactive functions, the system provides guidance to the user based on the context of the current state of the network, rather than simply providing generic instructions for "standard" installations.

Figure 3:
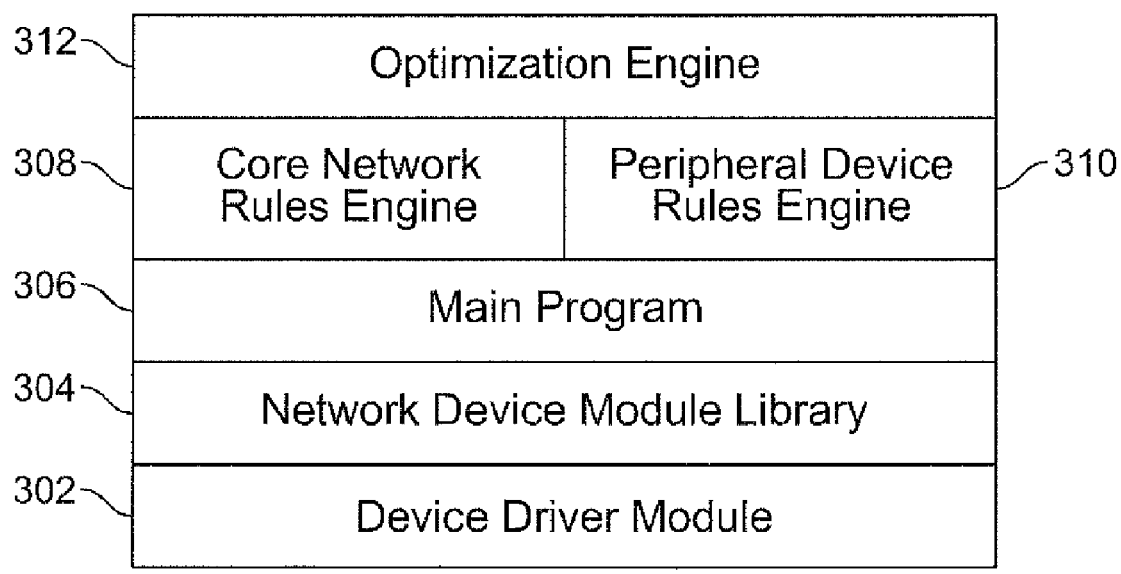
FIG. 3 is a high level block diagram of a network management system, in accordance with embodiments of the present invention.

FIG. 3 is a high level block diagram of a network management system in accordance with embodiments of the present invention. This network management system may be implemented as a software application executed on a PC attached to the network. The device driver module 302 provides low level device drivers for interrogating network equipment and for setting configuration parameters on that equipment. This may be accomplished using, e.g., an HTML interface or a UDP ("User Datagram Protocol") broadcasting method, as is used with conventional Setup Wizard installation utility software. In yet other embodiments, a standard Application Programming Interface (API) may be used for interfacing with network devices.

The network device module library 304 enables the management system to manipulate various network devices. The library 304 may contain profiles of various network devices that are supported and may be managed by the management system. This library may be updated periodically as new products are released.

The main program module 306 defines the operation of the main program and the user interface. It is generally desirable to provide a user interface that is intuitive and technically suited for the level of expertise of the target user of the management system.

The core network rules engine 308 provides the control logic for identifying the current core state of the network, providing reactive support for managing changes to the core network, and providing proactive support for advising users on potential future changes to make to the core network. The core network rules engine 308 may be provided with a set of pre-designed settings and network design templates that the management system will follow when configuring a device on the network. The core network rules engine 308 further provides the flow logic that defines the core state transitions that are available for each core state.

The peripheral device rules engine 310 provides the control logic for identifying the current state of the peripheral devices on the network, providing reactive support for managing changes to the peripheral devices in the network, and providing proactive support for advising users on potential future changes to make to the peripheral devices in the network. The peripheral device rules engine 310 can provide, for example, IP addressing settings, firewall settings, wireless settings, and the ability to query end devices (such as PCs) to determine their current states.

The optimization engine 312 may be provided for optimizing configuration settings for core network devices and for peripheral devices, based on the specific combinations of core and peripheral devices. For example, if a network includes both an Internet camera and a VoIP telephone, the optimization engine may reduce the video frame rate for the Internet camera to preserve sufficient network bandwidth for the VoIP phone to operate with an acceptable level of quality. In another example, if the management system detects a voice-enabled device in the network, the management system may activate the QoS ("Quality of Service") function of the router to ensure that a sufficient throughput level is provided for the voice-enabled device.

Device Discovery

In accordance with embodiments of the present invention, the management system may be configured to automatically detect devices in the network and to continuously monitor the status of those devices to confirm that those devices remain present in the LAN.

The discovery process for detecting devices existing on the network may be accomplished in a variety of ways. For example, the management system may poll the router to obtain the DHCP ("Dynamic Host Configuration Protocol") client table or may ping LAN segment devices one at a time.

The discovery process for detecting new devices added to the network may also be accomplished in a variety of ways. For example, the management system may monitor network traffic to listen for UPnP ("Universal Plug and Play") announcements, UDP broadcast responses, and DHCP responses from a network router.

The management system may detect that a device has disconnected from the network by, e.g., monitoring network traffic to listen for UPnP disconnect announcements, polling for known devices on the network, polling the router is DHCP client table and comparing the response against the previously received response, and ping LAN segment devices one at a time.

It may be desirable in some implementations for the management system to distinguish between those devices that should remain attached to the network at all times and those that may disconnect from the network periodically. This will enable the management system to limit alerts to the user regarding changes to the network only when some action needs to be taken. For example, devices such as routers, wireless access points, and NAS devices should remain constantly available on the network. Thus, when the management system detects that one of these types of devices is no longer available on the network, some action should be taken, such as alerting the user and/or reconfiguring other network devices to accommodate the change.

The presence of other types of devices on the network may not warrant action by the management system. For example, devices such as desktop and laptop PCs are often periodically shut down or physically removed from the network. Thus, when the management system detects that a previously-detected PC is no longer available on the network, no action need be taken.

Thus, the use of categorizations of devices can enable the management system react to only those types of events that actually require intervention.

Core State Matrix

In accordance with embodiments of the present invention, the core network rules engine 308 for the network management system may utilize core state matrices for defining the various network states and for managing core state transitions. Table 2 shows an exemplary core state transition matrix illustrating a plurality of core network states available to a computer network using the core network functions of M (modem), R (router), A (wireless access point, 802.11b or 802.11g), and V (voice router), as described above. This is only a partial table for illustrative purposes, and it is understood that other network functions, core network states, and state transitions are possible.

TABLE 2

Core State Transition

| State # | Core State Functions | Possible Entry States | Recommended Next State |
|---|---|---|---|
| 1 | None (new network) | 0 | 8, 4 |
| 2 | M | 1 | 8, 4 |
| 3 | M + V | 2, 6 | 5 |
| 4 | M + VA | 2, 3, 5, 6, 7, 8 | None |
| 5 | M + A + V | 3, 7 | None |
| 6 | M + R | 2 | 8, 4 |
| 7 | M + R + A | 6 | 8, 4, 5 |
| 8 | M + RA | 2, 6, 7 | 4 |

For this example, certain assumptions have been established to govern the process of managing the network. First, all core network states have either a single router function or two router functions, if one of the two router functions is a voice router function. It is assumed for the purposes of this example that any network incorporating three or more router functions would be managed by an administrator with sufficient technical expertise that the automatic management provided by the management system would not be needed. In addition, it is assumed that any core state transition would involve the addition of a new device or the replacement of existing device with a new device having equal or greater functionality. It is to be understood that these assumptions are made for the purposes of simplification and efficiency, and in other embodiments, these assumptions need not be made.

In Table 2, the first column represents an identification number assigned to the core state represented in the second column. The third column indicates all possible core states that could have existed prior to the existence of the current core state. The network can transition from the previous core state to the current core state in the event of a core state transition, which represents a change in a single core function in the network. This information may be utilized by the management system to handle the addition of new devices to the network. The core state matrix allows for exactly one possible core state transition (and associated routine) for each combination of possible entry state and new product being acquired.

The fourth column provides proactive assistance to users by representing the core state transitions that the management system may recommend that a user consider implementing to provide addition core functions on the network.

For example, in core state #1, no core network devices exist. This would be the situation for a user installing a computer network for the first time. In this case, there would be no possible entry state, since core state #1 represents the entry state for any new network. If the user requested that the management system provide a recommendation regarding what sort of network to implement starting from core state #1, the management system would recommend that the user transition to either core state #8 or #4. In other words, the management system would recommend that the user install a modem and a voice router/wireless access point combination device (core state #4), if the user wanted voice routing functionality and wireless access, or a modem and a router/wireless access point combination device (core state #4), if the user only wanted wireless access to the network without voice functionality. There are other possible next states, but by constraining the choices to the most popular, users get the benefit of the "expert" helping them to pick the best choices from the many. This is an example of proactive assistance provided to the user.

In another example, if the network management system detects that the network is made up of a modem and a router, the management system will represent the core network state as M+R (core state #6 in Table 2). The core state that immediately preceded the current state is M (core state #2), and the transition from core state #2 to core state #6 was accomplished by adding a router. Given the current state of the network, the management system may recommend that the user transition to either core state #4, or #8. Transitioning to core state #4 would add wireless and voice functionality to the network by replacing the existing router with a combination voice/WAP router, and transitioning to core state #8 would add wireless functionality to the network by replacing the existing router with a wireless router.

In some embodiments, the management system may be configured to apply a preference value to each of the potential core states for the network. This preference value may be used to assist the user in making decisions regarding future core state transitions. Similarly, the management system may be configured to apply a preference value to individual types of network devices.

For example, when a user attempts to make a change that would result in the implementation of a core state having a lower preference value than the current core state, the management system may issue a warning to the user indicating that the new core state is less preferred than the current core state. This warning may provide an explanation to the user of the functionality that will be lost or other undesirable results of implementing the desired transition. For example, if the user currently has a wireless 802.11a/b/g router, but wishes to replace it with a wireless 802.11b router, the management system may warn the user that the transition may result in substantially reduced bandwidth for the peripheral devices connected through the WAP. The management system should provide the user the ability to revert back to the previous core state, or to override the recommendation from the system and proceed with the transition.

It is to be understood that this is merely a simplified example. In other embodiments, the recommended next state may vary, depending on the types of network devices available on the market. For example, in the future a combination device providing modem, router, wireless, and voice functions may become widely available. This device would be added as a potential current core state and as a potential future state for the network. In addition, a state transition matrix which incorporates both core and peripheral devices may be provided.

Figure 4:
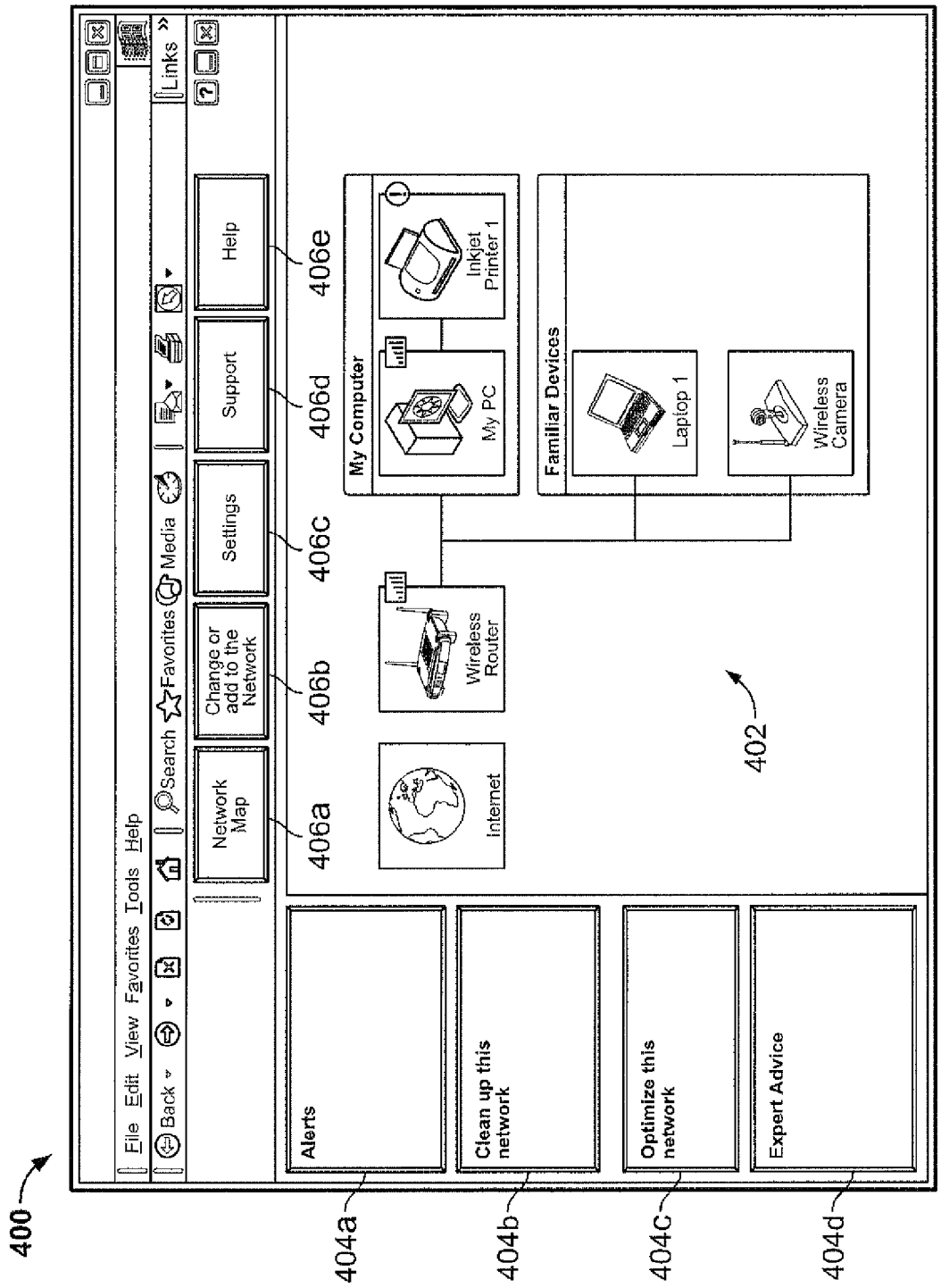
FIG. 4 is an exemplary management interface 400 for a network management system, in accordance with embodiments of the present invention.

FIG. 4 is an exemplary management interface 400 for a network management system, in accordance with embodiments of the present invention. The interface 400 provides a network map 402 illustrating the state of the network. This network map 402 may provide an illustration of just the core devices (e.g., modems, routers, WAPs, etc.) or provide an illustration of all devices in the network, as shown in FIG. 4.

In addition to providing information about the state of the network, the interface 400 also provides a plurality of selections that are available to the user. In the illustrated example, the action boxes 404a-404c arranged vertically on the left side of the interface 400 represent context sensitive tasks that provide proactive management services to the user. The action boxes 406a-406d arranged horizontally on the top of the interface 400 represent reactive management services that may be selected by the user. In addition, a help box 406e is available to provide detailed instructions for operating the interface 400.

The "Alerts" box 404a notifies the user when the management system detects something in the network that is beyond the range of normal operation. The "Alerts" box 404a may advise the user to take some action that the management system has determined is necessary or advisable to execute. Under normal operation, a "normal" icon, such as a green light, checkmark, or "thumbs up" graphic is provided to indicate that the network is operating as expected.

The "Alerts" box 404a may provide information regarding a variety of potential network issues. For example, if the management system loses its wireless connection to the router, the "Alerts" box 404a may indicate a problem with the wireless network. If the management system can connect to the router, but is unable to reach the Internet, the box 404a may indicate a problem with the broadband connection. If a previously unknown device is detected on the network, the box 404a may indicate the presence of an unexpected device. If the management system detects that a device which is normally expected to be present on the network (e.g., a NAS device or a print server) is no longer available, the box 404a may indicate that an "always on" device is missing. If the management system receives notice that a program update or firmware update for any of the devices on the network is available, the box 404a may advise the user to download and install the update. This is merely an exemplary list of alerts, and in operation, other alerts may be implemented as well.

In response to the alert in the "Alerts" box 404a, the user may instruct the management system to execute a troubleshooting routine to attempt to resolve the detected problem. For example, if a problem with the wireless network is detected, the troubleshooting routine may include performing basic PC checks to ensure that the wireless adapter for the PC running the management system software is operating correctly. The troubleshooting routine may also guide the user through basic troubleshooting steps, such as checking router lights and network cabling. If a problem with the broadband connection is detected, the troubleshooting routine may include a check of the WAN status on the router, an attempt to access known web sites on the Internet, and instructions to the user to check status lights on the router and modem, and to reboot the modem or call the ISP, as appropriate. Similar troubleshooting routines involving action by the management system and action by the user may be implemented for the other possible alerts.

The "Clean Up" box 404b provides an alert to users that one or more configuration settings currently implemented in the network does not conform to the optimal parameters defined for the detected state of the network. For example, if the core state of the network includes an wireless router, but no wireless encryption protocol is being used, the "Clean Up" box 404b will advise the user to implement recommended security measures. Once authorized by the user, the management system may automatically configure the wireless router and all network devices to implement the recommended security measures. In another example, if the core state of the network includes an wireless router, but the management system detects that the password on the router has not been changed from the default password, the management system will advise the user to select a new password for the router.

The "Clean Up" box 404b may also provide explanatory information for each alert so that the user understands the actions recommended by the management system. This may be accomplished by providing two options for each alert: "Why?" and "Do It". If the user selects the "Why?" option, the management system will provide a detailed description of the detected problem, the risks involved, and the proposed solution. If the user selects the "Do It" option, the management system will proceed with implementing the recommended configuration setting changes.

The "Optimize This Network" box 404c is provided to enable a user to maximize the value from the existing configuration of devices in the network. The management system utilizes its knowledge of the devices that are in the network and the functionality provided by those devices to generate recommendations for modifications that can be made to provide additional functionality. The recommendations can be retrieved from a data structure accessible by the optimization engine 312.

For example, if the management system detects that the current network state includes a wireless camera and a NAS storage device, the management system may recommend that the user configure the camera to save video streams in the NAS device. Another optimizable situation would be if the network contains both a NAS storage device and a media server. In this case, the management system may recommend that the media server be configured to receive streamed media content from the NAS device.

As with the "Clean Up" box 404b, the "Optimize This Network" box 404c may also provide the user with the "Why?" and "Do It" options for providing additional information regarding the proposed modifications.

The "Expert Advice" box 404d provides guidance to the user on additional functionality that may be provided. The management system examines the current state of the network and based on the detected state of the network, recommends a change to the existing network configuration. The recommendations may include a change to the core state of the network or the addition of a new peripheral to the network.

Various core state changes may be recommended. For example, if the management system detects that a wired router is connected to three or more devices, the system may recommend that the user add additional ports to the network by purchasing and installing a switch. The system may even provide a link to a web site for purchasing the recommended equipment. If the management system detects that the core state of the network includes only a wired router, the system may recommend a transition to a core state including wireless functionality, such as the purchase and installation of a wireless router. If the management system detects a spare port on the router, the system may recommend that a NAS device be added to the network to provide data storage and/or backup. If the management system detects that the state of the network includes multiple PCs but no networked printers, the system may recommend the purchase and installation of a print server.

The management system may be provided with a database of recommendations based on the various potential states of the network. Additional recommendations may be added as new core and peripheral network products emerge.

In the "Expert Device" box 404d, the user may be provided a different set of options for each alert: "Why?", "What Do I Need?", "Guide Me", and "No, Thanks". The "Why?" selection provides the user with an explanation of the recommended course of action and the benefits that may be obtained. The "What Do I Need?" selection provides a description of the products to buy in order to follow the system's recommendation. This description may be printed for the user to carry to a retail store, or may include a link to an online retailer of the necessary equipment. The "Guide Me" selection provides instructions on how to install the new equipment. The "No, Thanks" selection removes the alert of the recommended modification.

The "Network Map" box 406a causes the management system to initiate a discovery process to detect the current state of the network and to refresh the graphical network map 402. The management system may be configured to perform the discovery process on a regular schedule, but the user may select the "Network Map" option immediately after a new device has been installed to confirm that the installation was performed properly.

The "Change or Add to the Network Subtasks" button 406b is selected when the user wishes to initiate a state transition routine. In other words, when the user wishes to make a change to the state of the network (such as, e.g., by adding a new peripheral), the user selects this menu item to begin the installation process.

In this embodiment, the "Change" button 406b is configured to provide a pull-down menu of further options. One option is to add a new device to the network. In response to this option, the management system determines the existing state of the network. Next, the system identifies the new device to be installed, either by automatic detection or by user prompt. Next, based on the state of the network and the desired change, the system determines the appropriate core state transition routine to execute or the peripheral to be added. Finally, the system executes the appropriate routine to manage either the core state transition or the peripheral addition.

During the addition process, the management system may provide audio and/or video animations to provide the user with detailed instructions on what steps should be taken. Context sensitive help may also be provided, to give the user additional instructions, if needed. In a preferred implementation, the management system will obtain as much information as possible automatically without user input. The system will only prompt the user for information input when the information is not otherwise accessible to the system.

In one embodiment, when the user is attempting to add a new wireless PC to the network, the management system will generate an executable file to be executed on the new PC. This file will be provided with the appropriate settings given the existing state of the network to automatically configure the new PC to connect to the wireless network. For example, if the current wireless network is configured to use WEP encryption, the executable file can automatically provide the new PC with the necessary encryption key to access the network.

The "Settings" box 406c enables the user to modify the settings which control the operation of the network management system. For example, the user may choose between an "Expert" mode, in which detailed network information is provided, and a "Normal" mode, in which technical details are hidden from the user. These technical details can be provided in the network map 402 or in various menus in the management system.

The "Support" box 406d enables users to receive customized technical support for the network. The "Support" box 406d may provide the user with multiple support options. First, a "Print Sheet" option may be provided. This option will generate a detailed description of the state of the network and the configuration settings for the core and peripheral devices. This network state report can be used to assist users and technical support personnel in troubleshooting the network. In one embodiment, the network state report may comprise a document which contains information relevant to the network and the devices contained in the network. This document can be printed to provide a hardcopy reference to be used by the user when calling a support line and speaking with technical support personnel. Often, when a non-technical user calls into a support line, the user may have difficulty in providing the technical support specialist with basic information necessary for diagnosing the problem on the network. This network state report can provide all the information that might be requested by the technical support specialist during a support call. Alternatively, the document may be provided as an electronic file (e.g., an HTML file) which can be saved locally or transmitted electronically to the technical support specialist for review.

An "E-mail Support" option may be provided for automatically generating an email to a technical support center. This email can include a description portion entered by the user, and may also include detailed information regarding the state of the network to assist the technical support personnel in diagnosing problems.

A "Chat Support" option may be provided for automatically connecting the user with a technical support specialist via an online chat session. Detailed information regarding the state of the network can also be transmitted to the technical support specialist so that both the user and the specialist can view the network map 402 and review the configuration settings simultaneously. This network state report could be used to automatically generate on the specialist's remote computer the network map of the user's computer network. This can improve the efficiency with which technical support is provided to the user.

Finally, the "Help" box 406e provides instructions on how to use the network management system.

Figure 5:
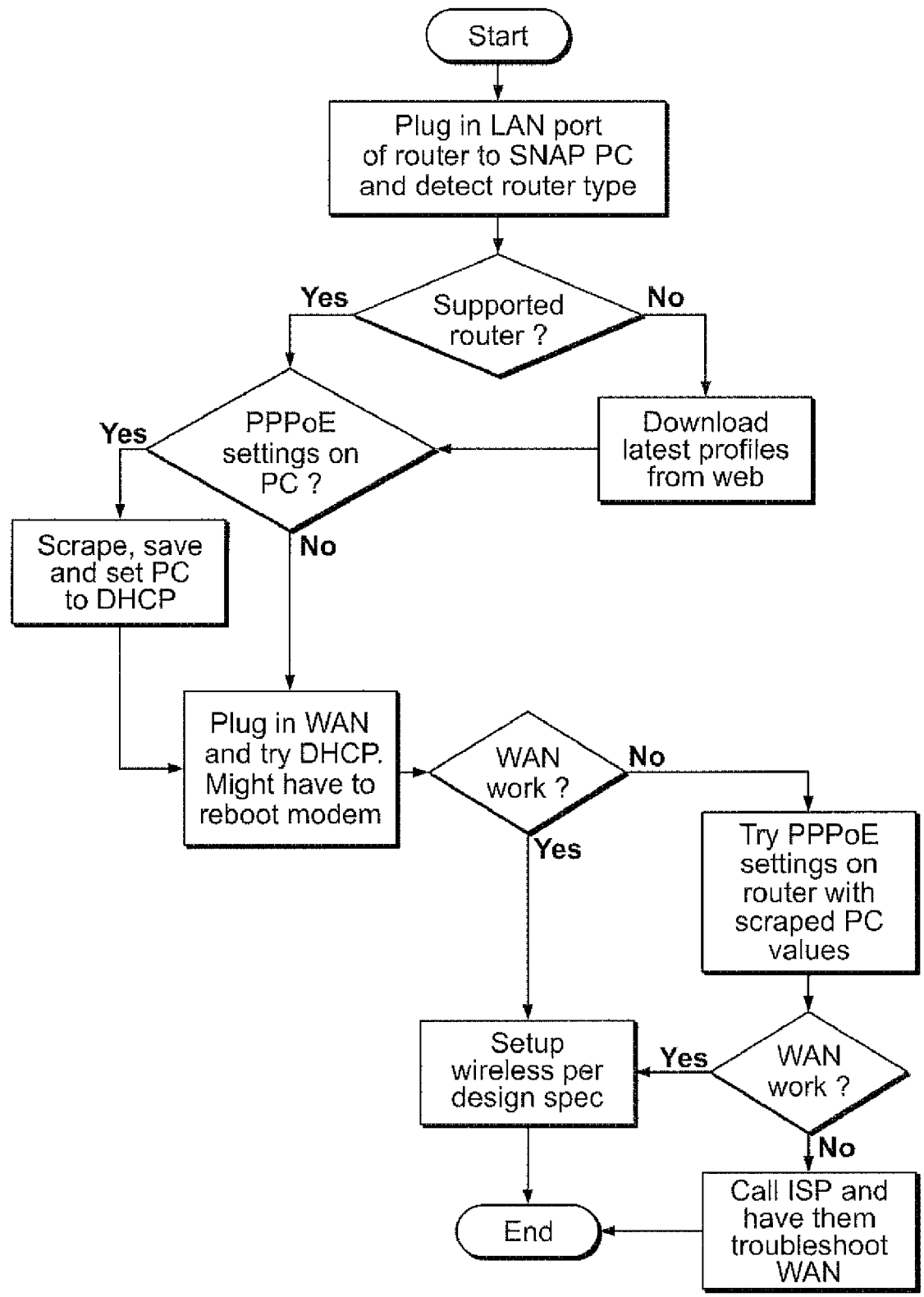
FIG. 5 is a flowchart illustrating the transition routine that may be performed for a new wireless router installation.
Figure 6:
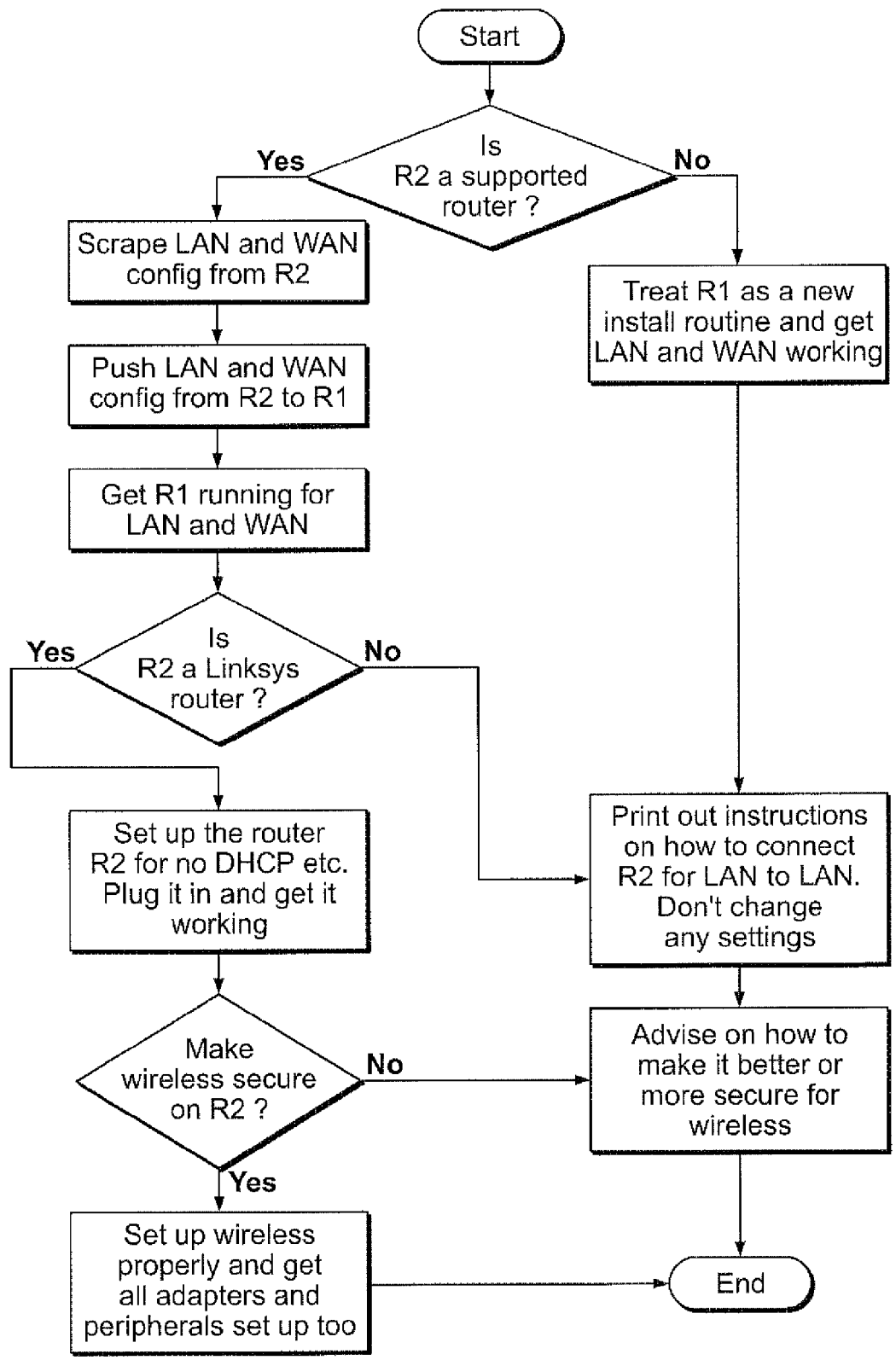
FIG. 6 is a flowchart illustrating the transition routine that may be performed when a voice router is added to a network already containing a modem and a separate wireless router device.
Figure 7:
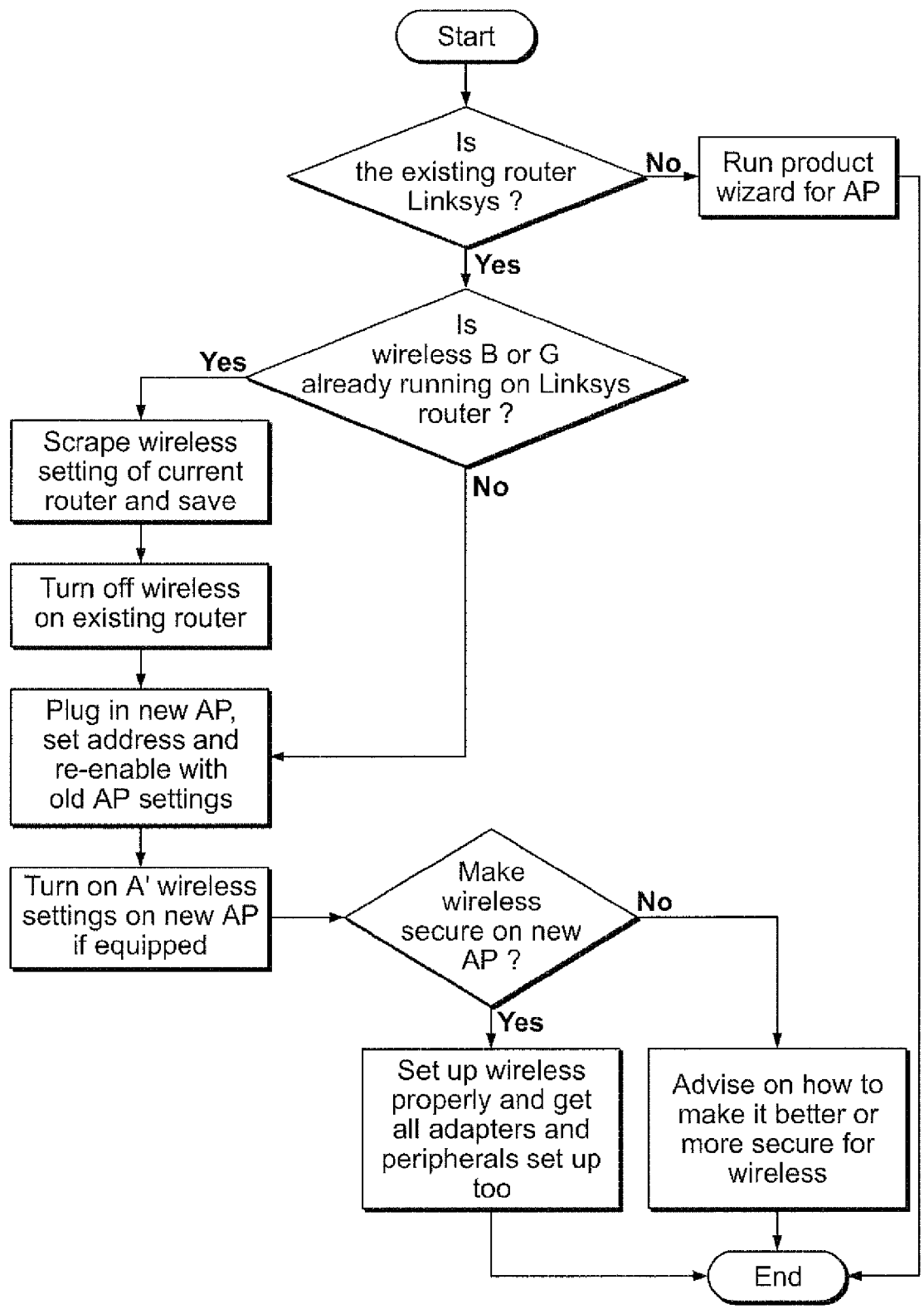
FIG. 7 is a flowchart illustrating the transition routine that may be performed when adding a WAP device to a network having an existing router.

FIGS. 5-7 are flowcharts illustrating exemplary transition routines that may be performed by a network management system, in accordance with embodiments of the present invention.

Example 1

Adding a Wireless Router

FIG. 5 is a flowchart illustrating the transition routine that may be performed for a new wireless router installation. In other words, this transition routine applies when transitioning from a core network of M to a core network of M+RA.

In step 501, the PC executing the network management software application is connected to the new router using, e.g., an Ethernet cable which connects an Ethernet port on the PC to a LAN port on the router. In step 502, the management system determines whether the router is currently supported by the network device module library 304 and the device drivers 302. If not, then in step 503, the system retrieves the device profile from a profile server accessible on the Internet through an existing Internet connection. In step 504, the system would determine whether the PPPoE ("Point-to-Point Protocol over Ethernet") settings for the network are already available on the PC. If so, then in step 505, these PPPoE settings are saved and used on the router. The PC is set to receive a dynamic IP address from the router via DHCP.

In step 506, the user is instructed to connect the router to the WAN. This can be performed by showing an image or playing a video illustrating how to connect the network cabling between the modem and the router. If appropriate, the modem is rebooted.

In step 507, the system checks to determine whether the PC has been successfully connected to the WAN. If not, then in step 508 the system applies the PPPoE settings to the router with the values retrieved from the PC. If the WAN still does not work, then in step 510 the system will instruct the user to contact the ISP ("Internet Service Provider") supplying the WAN connection to assist in troubleshooting the WAN. If the WAN connection is successful, then in step 511 the system configures the wireless settings for the router using the default configuration settings.

Example 2

Adding a Voice Router

FIG. 6 is a flowchart illustrating the transition routine that may be performed when a voice router is added to a network already containing a modem and a separate wireless router device. In other words, this transition routine applies when transitioning from a core network of M+RA to a core network of M+V+RA. In FIG. 6, the existing wireless router device is indicated by R2 and the new voice router is indicated by R1.

In step 601, the network management system determines whether R2 is a router already supported by the network device module library 304 and the device driver module 302. If not, then R1 is installed using the transition routine described above with respect to FIG. 5.

If R2 is a supported router, then in step 603 the LAN and WAN configuration settings are retrieved from router R2. Next, in step 604 the LAN and WAN configuration settings retrieved from router R2 are applied to the new router R1. In step 605, the new router R1 is connected to the system and activated in the same manner as the existing router. In step 606, the management system determines whether router R2 is a supported router. In some cases, it may be desirable to limit the system to controlling routers that have been tested and identified as properly supported.

If the router R2 is a Linksys router, then in step 607, the management system configures router R2 not to use DHCP. If the router R2 is not a Linksys router, in step 608, instructions for how to connect the router R2 in a LAN-to-LAN configuration are printed. The user then uses these instructions to connect the two routers.

In step 609, the management system queries the user to determine whether the user wishes to apply security settings to the wireless network. If the user does not wish to add wireless security to the router R2, then in step 610, the management system advises the user on the importance of wireless security and the steps that could be taken to improve security. If a user wishes to add wireless security to the router R2, then the management system automatically configures the router R2 and all peripheral devices to use the same security protocol. If the management system does not have access to change the security settings on any of the peripheral devices, the management system may provide instructions to the user on how to configure those peripherals to communicate with the network.

Example 3

Adding a Wireless Router

FIG. 7 is a flowchart illustrating the transition routine that may be performed when adding a 802.11a WAP device to a network having an existing router. In step 701, the management system determines whether the existing router is supported by the network device module library 304 and the device driver module 302. If not, then in step 702, the management system directs the user to run the standard installation utility Setup Wizard for the new 802.11a WAP device.

If the existing router is supported by the management system, then in step 703, the management system determines whether the existing router is already providing either 802.11b or 802.11g wireless services. If it is, then in step 704, the existing wireless settings are retrieved from the existing router and are saved. Then in step 705, the wireless functionality of the existing router is turned off. Next, in step 706, the management system instructs the user to physically connect the new WAP device. Once the new WAP device is connected, in step 706, the configuration settings from the previous waft router are applied to the new WAP device (e.g. automatically by the management system, or manually by the user). Finally, in step 707, the 802.11a functionality is activated.

In step 708, the management system queries the user to determine whether the user wishes to apply security settings to the wireless network. If the user does not wish to add wireless security to the new WAP device, then in step 709, the management system advises the user on the importance of wireless security and the steps that could be taken to improve security. If a user wishes to add wireless security to the new WAP device, then in step 710, the management system automatically configures the new WAP device and all peripheral devices to use the same security protocol. If the management system does not have access to change the security settings on any of the peripheral devices, the management system may provide instructions to the user on how to configure those peripherals to communicate with the network.

Example 4

Replacing Existing Network Equipment

In many cases, a user may wish to merely replace a network device with another network device that provides the same or greater functionality. In the case where the new device provides the same functionality, the devices forming the network may change, while the core state of the computer network remains the same. However, even when the core state does not change, it would be desirable for the management system to assist the user in making the change to the network.

This assistance may be provided in a variety of ways. For example, before the user disconnects the old network device (e.g., an old router), the management system may retrieve all available configuration settings from the old router and save them temporarily. The management system may alternatively retrieve many of these configuration settings by examining the configuration settings of the peripheral devices in the network. Once the management system has retrieved and saved all available configuration settings, the system can instruct the user on how to physically remove the old equipment and replace it with the new equipment. After the new equipment has been connected to the network and is accessible to the management system, the management system can attempt to automatically propagate the old configuration settings into the new device. If the management system lacks the ability to remotely make the desired configuration setting changes, the system may instruct the user on how to do so manually (e.g., by using the installation utility bundled with the new device).

Example 5

Adding Peripheral Devices to the Network

The network management system may also be configured to provide assistance to the user in replacing peripheral devices and adding new peripheral devices to the network.

For peripheral devices that connect to the network via network cabling, the management system may provide on screen instructions for manually connecting the cables to the appropriate ports on the peripheral device and the router. If the management system detects that in the current state of the network, no ports are available on the router, then the system can provide guidance to the user on the changes to be made to the state of the current network in order to achieve the desired functionality. In other words, the management system will examine the current state of the network (e.g, no available ports on the router) and the functionality desired by the user (e.g., to connect a new PC to the network), and provide the user with instructions and/or options, where available, on how to proceed. In the case of the router with no available ports, the management system can advise the user to purchase a switch to connect to the router so that additional devices can be connected. The management system may even provide a link to a web site where the user may purchase the necessary equipment. The management system may also provide the alternative solution of purchasing a wireless router and a wireless adapter for connecting the new PC.

In addition to providing assistance with the manual installation of the new peripheral device, the management system may also provide assistance with configuring the new device to properly communicate with the network. For example, if the network is already configured with a DHCP server, the management system may provide instructions to the user for configuring the new PC to utilize DHCP, rather than a fixed IP address.

The addition of a wireless peripheral device may also be managed by the network management system. For example, if a user wishes to add a new PC having a wireless adapter card to the network, the management system can assist the user in configuring the new PC with the proper security settings to be compatible with the existing state of the network. This may be particularly important if the new wireless device is configured to use WEP ("Wired Equivalent Privacy") encryption by default. If the existing wireless network has implemented WPA ("WiFi Protected Access") encryption, the management system will configure the new device to use WPA instead of WEP.

The network management system may also be configured to monitor the use of all static IP addresses in the network. Thus, if the user attempts to transition the network by adding a new device using the same static IP address as an existing device, the management system can intervene by warning the user and/or automatically reassigning a new, non-conflicting IP address to one of the devices.

It would generally be preferred for the management system to automatically configure all core network devices and peripheral devices to adapt to changes in the state of the network. However, in some cases, the management system may not have access to a device in which a configuration setting needs to be adjusted. This may be the case if the new device is not accessible over the network, or if the new device is from a different manufacturer and does not include a management interface that is compatible with the management system. In this case, the management system can provide instructions to the user, either on screen or on a hard copy printout, on how to make the necessary adjustments manually.

In accordance with another aspect of the present invention, some management systems may be configured to allow users to override the configuration settings applied by the management system. This may be desirable, for example, if the user has some level of technical expertise and wishes to customize the implementation of the network. One way in which this may be accomplished is to provide three types of parameter settings. First, the default settings are the settings automatically provided by the management system. Second, the user override settings are manually selected by a user and saved as a set of override settings. Third, a current configured setting which represents a recently-entered setting that has not been saved. A user may then revert back to either the default settings or the previous user override settings, or may save the current configured setting as a new user override setting.

The management system will keep track of the current settings and will apply those current settings to modify the rules engine in making future decisions regarding the network. The management system may further report the override settings back to a central host which tracks the settings from numerous users. This information can be used to make modifications to the rules engine implemented by future revisions of the management system.

While the invention has been described in terms of particular embodiments and illustrative figures, those of ordinary skill in the art will recognize that the invention is not limited to the embodiments or figures described. For example, in many of the embodiments described above, the core network functions were defined as the modem, router, voice router, and wireless access point. It will be understood that this is merely an exemplary list of network functions. In other embodiments, greater or fewer network functions may be used in defining the core state of the network. As new network devices are developed, the functions provided by these devices may be added to the definition list for the network.

In addition, the network state transitions described above are merely exemplary. In other implementations, the transition routines may vary.

The program logic described indicates certain events occurring in a certain order. Those of ordinary skill in the art will recognize that the ordering of certain programming steps or program flow may be modified without affecting the overall operation performed by the preferred embodiment logic, and such modifications are in accordance with the various embodiments of the invention. Additionally, certain of the steps may be performed concurrently in a parallel process when possible, as well as performed sequentially as described above.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A system comprising:
  a processor connected to a network; and
  a storage device in communication with the processor, the storage device containing computer-readable instructions for managing the network, which, when executed by the processor, the processor is operable to:
  define a plurality of network states, each network state representing a topology of the network;
  identify a current network state of the network from the plurality of network states, the current network state representing an existing topology of the network;
  identify a recommended next network state of the network from the plurality of network states, the recommended next network state representing a change to the current network state, the recommended next network state representing an enhanced topology of the network;
  recommend the recommended next network state to a user; and
  provide the user with instructions for modifying the existing topology of the network based on the current network state to the enhanced topology of the network based on the recommended next network state.

2. The system of claim 1, wherein:
  each topology of the network represented by a network state includes one or more network devices and functions of the network devices.

3. The system of claim 1, wherein:
  each topology of the network represented by a network state includes one or more network devices and functions of the network devices; and
  the one or more network devices of the network includes one or more of:
  a modem adapted to bridge the network with a wide area network (WAN),
  a wireless access point (WAP) and router adapted to connect the network devices to the modem, or
  a voice router adapted for connection between the modem and the wireless access point and router, the voice router adapted to provide phone services to an analog telephone using voice over Internet protocol (VoIP).

4. The system of claim 1, wherein
  identifying the current network state comprises detecting the existing topology of the network and determining the network state corresponding to the detected topology of the network.

5. The system of claim 1, wherein the processor is further operable to:
  identify a new device to be added to the network;
  select, based on the current network state, a state transition routine for managing the addition of the new device to the network; and
  execute the state transition routine to provide instructions to a user for changing the topology of the network.

6. The system of claim 1, wherein:
  recommending the recommended next network state to the user is based on the current network state and includes recommending a change to the existing topology of the network.

7. The system of claim 1, wherein the processor is further operable to:
  identify a group of potential network state transitions available for the identified current network state, wherein a preference value is assigned to each of the potential network state transitions in the group of potential network state transitions; and
  recommend to the user a network state transition based on the preference value of the recommended network state transition.

8. A method comprising:
  defining a plurality of network states, each network state representing a topology of the network;
  identifying a current network state of the network from the plurality of network states, the current network state representing an existing topology of the network;
  identifying a recommended next network state of the network from the plurality of network states, the recommended next network state representing a change to the current network state, the recommended next network state representing an enhanced topology of the network;
  recommending the recommended next network state to a user; and
  providing the user with instructions for modifying the existing topology of the network based on the current network state to the enhanced topology of the network based on the recommended next network state.

9. The method of claim 8, wherein:
  each topology of the network represented by a network state includes one or more network devices and functions of the network devices.

10. The method of claim 8, wherein each topology of the network represented by a network state includes one or more network devices and functions of the network devices; and the one or more network devices of the network includes at least one of:

a modem adapted to bridge the network with a wide area network (WAN), and a wireless access point (WAP) and router adapted to connect the network devices to the modem; or a voice router adapted for connection between the modem and the wireless access point and router, the voice router adapted to provide phone services to an analog telephone using voice over Internet protocol (VoIP).

11. The method of claim 8, further comprising:

identifying a new device to be added to the network, wherein identifying the new device to be added to the network comprises detecting a connection of the new device to the network; and selecting, based on the current network state, a state transition routine for managing the addition of the new device to the network.

12. The method of claim 8, wherein:

modifying the topology of the network comprises adding a new network device to the network.

13. The method of claim 8, further comprising:

recommending the recommended next network state to the user is based on the current network state and includes recommending a change to the existing topology of the network, wherein:

recommending the change to the existing topology comprises selecting the recommended next network state from a group of potential network state transitions available for the identified current network state.

14. The method of claim 8, further comprising:

identifying a group of potential network state transitions available for the identified current network state, wherein a preference value is assigned to each of the potential network state transitions in the group of potential network state transitions; and in response to detecting an attempt to change to a new network state, wherein a preference value for the new network state is inferior to a preference value for the current network state, warning a user of the inferiority of the new network state.

15. The method of claim 8, further comprising generating a network state report including:

information regarding the current network state; and information regarding configuration settings of peripheral devices on the network.

16. A computer program product comprising a non-transitory computer readable medium having computer readable and executable code for instructing a processor to perform a method, the method comprising:

defining a plurality of network states, each network state representing a topology of the network;

identifying a current network state of the network from the plurality of network states, the current network state representing an existing topology of the network;

identifying a recommended next network state of the network from the plurality of network states, the recommended next network state representing a change to the current network state, the recommended next network state representing an enhanced topology of the network;

recommending the recommended next network state to a user; and providing the user with instructions for modifying the existing topology of the network based on the current network state to the enhanced topology of the network based on the recommended next network state.

17. The computer program product of claim 16, further comprising:

identifying a new device to be added to the network; wherein identifying the new device to be added to the network comprises receiving an input from a user indicating the new device to be added to the network; and selecting, based on the current network state, a state transition routine for managing the addition of the new device to the network.

18. The computer program product of claim 16, wherein:

providing instructions to the user for modifying the topology of the network comprises providing instructions to the user for manually connecting computer hardware.

19. The computer program product of claim 16, wherein:

providing instructions to the user for modifying the topology of the network comprises providing instructions to the user for adjusting configuration settings.

20. The computer program product of claim 16, wherein:

the plurality of network states comprises a plurality of core states, each core state representing a topology of core network device types.

* * * * *